INVENTORS
ELLWOOD R. WATSON
GENE V. ROWLEY
CHARLES R. WUNDERLICH
BY Edward O. Ansell
William E. Hiller
ATTORNEYS

INVENTORS
ELLWOOD R. WATSON
GENE V. ROWLEY
CHARLES R. WUNDERLICH

United States Patent Office 3,432,585
Patented Mar. 11, 1969

3,432,585
METHOD AND APPARATUS FOR CONTINUOUS FABRICATION OF DESALINATION MEMBRANE
Ellwood R. Watson, Glendora, Gene V. Rowley, Pomona, and Charles R. Wunderlich, Azusa, Calif., assignors to Aerojet-General Corporation, El Monte, Calif., a corporation of Ohio
Filed Apr. 18, 1966, Ser. No. 543,369
U.S. Cl. 264—49
Int. Cl. B29d 7/02
13 Claims

ABSTRACT OF THE DISCLOSURE

This disclosure concerns a method and apparatus for continuously fabricating desalination membrane material of cellulose acetate in an elongated web form, wherein the membrane material so produced is of high uniformity and is suitable for use in desalination processes operating on the principle of reverse osmosis. In practicing the method, a film-forming casting solution of cellulose acetate is continuously deposited along the surface of a moving elongated belt which is directed into a refrigerated water bath to subject the coating of casting solution on the belt to the refrigerated water bath. The coating gels to form a film which is automatically stripped from the belt and directed into a heated water bath, with the film being thereafter wound on a take-up roll and stored under water in a continuing sequence.

---

This invention relates to the production of a membrane suitable for use in desalination processes involving the principle of reverse osmosis, and more particularly to a method and apparatus capable of continuously producing such membrane material in elongated web form.

Cellulose acetate membranes have been found to be suitable in reverse osmosis techniques for desalting brackish water or sea water. Such cellulose actetate membranes in order to be effective in desalination processes involving the principle of reverse osmosis must be made under exacting conditions, as for example, the maintenance of such membranes in treatment baths at selected temperatures and control of the water content of the membranes during their manufacture. Heretofore, cellulose acetate membranes for use in desalination processes involving the principle of reverse osmosis have been fabricated individually employing a so-called "batch" procedure, wherein the film-forming casting solution is individually prepared for each membrane and the membrane is manually cast and fabricated by hand. The manufacture of individual desalination membranes involving the "batch" procedure renders it difficult to maintain uniform conditions as to various parameters of temperature, time, and water content of the desalination membranes. Desalination membranes manufactured in this way lack homogeneity which detracts from the utility of the membranes. Furthermore, manual casting of individual desalination membranes is not conducive to uniformity therebetween, and a succession of membranes produced in such fashion may differ to a significant extent in their reliability for yielding salt-free water in desalination procedures involving the reverse osmosis technique. Coupled with the foregoing factors is the fact that the manufacture of individual desalination membranes is relatively expensive so as to render uneconomical a large scale application of a desalination process relying upon the principle of reverse osmosis and requiring such membranes.

It is therefore an object of the present invention to provide a method and apparatus for the continuous fabrication of a film in the form of an elongated web suitable for use as a desalination membrane for employment in desalination processes operating on the principle of reverse osmosis, wherein the elongated film may be produced under substantially uniform conditions as to various parameters, such as temperature, time, and water content, so as to achieve homogeneity in the film along its entire length which may then be used as one or more desalination membranes of uniformly high reliability.

It is another object of this invention to provide a method and apparatus for continuously fabricating a cellulose acetate film suitable for use as a desalination membrane in desalination processes employing the principle of reverse osmosis, wherein the cellulose acetate film is formed by depositing a film-forming casting solution of cellulose acetate continuously along the surface of a moving elongated belt, and thereafter treating the film in a refrigerated water bath by directing the moving belt as coated with the film therethrough, and subsequently stripping the film from the belt and subjecting the film to a heated water bath treatment, whereupon the film is wound on a take-up roll and stored under water in a continuing sequence.

The present method and apparatus therefore accomplish continuous production of an elongated film suitable for use as a desalination membrane during which the film is exposed to air for only a small increment of time, which may be measured in fractions of a second. This is significant because the water content of a desalination membrane is critical to its proper performance in removing salt from brackish or sea water. The loss of water from such a membrane is irreversible and must be prevented if the membrane is to be relied upon for proper performance in desalination procedures employing the principle of reverse osmosis.

The present method and apparatus also do not require a solvent drying step following the casting of the film-forming solution, thereby avoiding exposure of the film to the air during this otherwise unproductive period and also permitting greater flexibility in the speed at which casting of the film-forming solution may be carried out. Formerly, the necessity for a solvent dry step following casting of the film-forming solution in producing the membrane imposed certain restrictions on the speed at which casting of the film-forming solution proceeded.

It is a further object of this invention to provide a method and apparatus for continuously fabricating a desalination membrane of the reverse osmosis type from a film-forming solution capable of being cast in sheet form, wherein the film-forming solution is continuously applied to the surface of a moving elongated belt so as to provide a substantially uniform coating of the film-forming solution along the length of the web. The apparatus by which the method is practiced includes a receptacle in which the film-forming casting solution is contained, the receptacle being disposed in overlying relationship to the moving belt and having a doctor blade for leveling the film-forming solution as it is deposited from the receptacle on the belt.

The present invention accomplishes the foregoing objects, and, in its broader aspects, involves the preparation of a film-forming casting solution comprising cellulose acetate dissolved in a solvent mixture, continuously applying the film-forming casting solution to the surface of a moving elongated belt so as to provide a substantially uniform coating along the length of the belt, thereafter conducting the moving belt as coated by the film-forming casting solution into a refrigerated water bath to immerse the film in the water for fixing the membrane, the refrigerated water bath achieving final desolvation of the solvent mixture from the cellulose acetate membrane and leaching out salts from the membrane. During its passage through the refrigerated water bath, the membrane is stripped from the moving belt and thereafter directed to a heated water bath to be subjected to a heat treatment. The heat treatment bath causes contraction of the cellulose acetate structure of the film to give it the property of passing pure water therethrough while rejecting salt. Upon emergence from the heated water bath, the film is passed through a series of water sprays so as to be moistened and cooled, thereby retaining a water content within a percentage range necessary for the proper performance of the membrane. The cooled film is then wound on a take-up roll and stored under water until used as one or more desalination membranes in a desalination process involving the principle of reverse osmosis. It will be noted that the method and apparatus according to the present invention do not require a solvent evaporation step following the casting of the film-forming solution to produce the membrane, thereby significantly reducing the time during which the membrane is exposed to air. This is a significant aid in maintaining the water content of the membrane within a range of percentages necessary to achieve proper performance of the membrane when used in a desalination process. By the elimination of the solvent drying step, the present method and apparatus also offer increased flexibility in the production of a desalination membrane in that the speed at which the film-forming solution is cast is not dependent upon the time required to accomplish solvent drying.

Some of the objects of the invention having been stated, other objects will become apparent as the description proceeds, when taken in connection with the accompanying drawings, in which.

Figure 1:
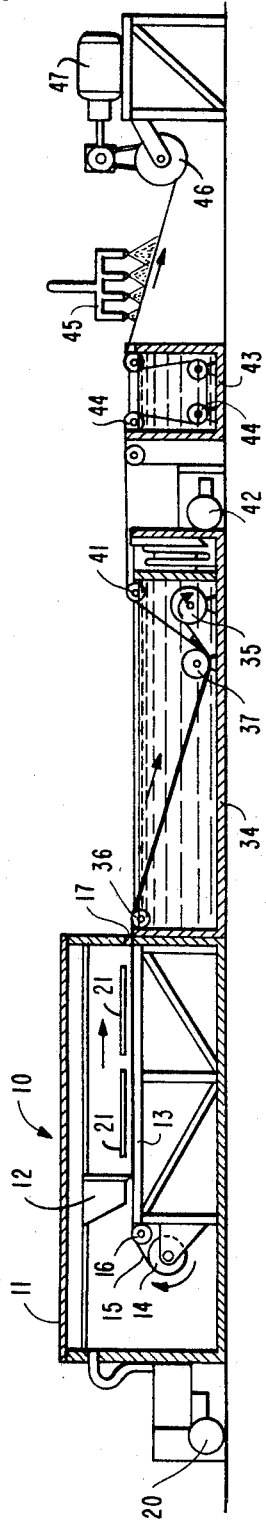
FIGURE 1 is a diagrammatic view, partially schematic in form, illustrating the apparatus according to the present invention and showing the method of continuously fabricating a desalination membrane.
Figure 2:
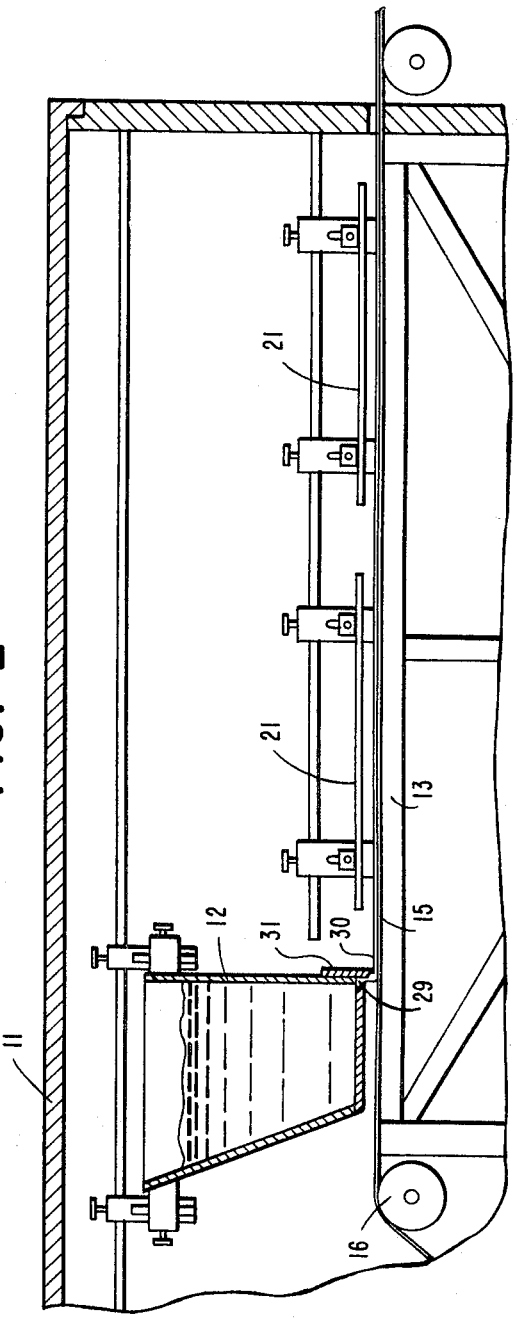
FIGURE 2 is an enlarged fragmentary longitudinal cross-sectional view illustrating the casting box assembly of FIGURE 1 and showing the step of applying the film-forming solution from the casting box to the surface of a moving elongated belt in accordance with the invention.
Figure 3:
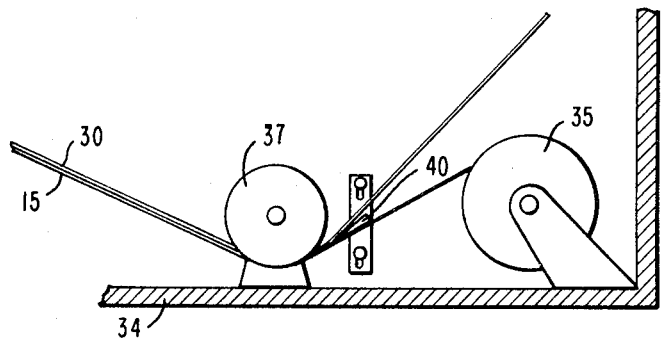
Figure 4:
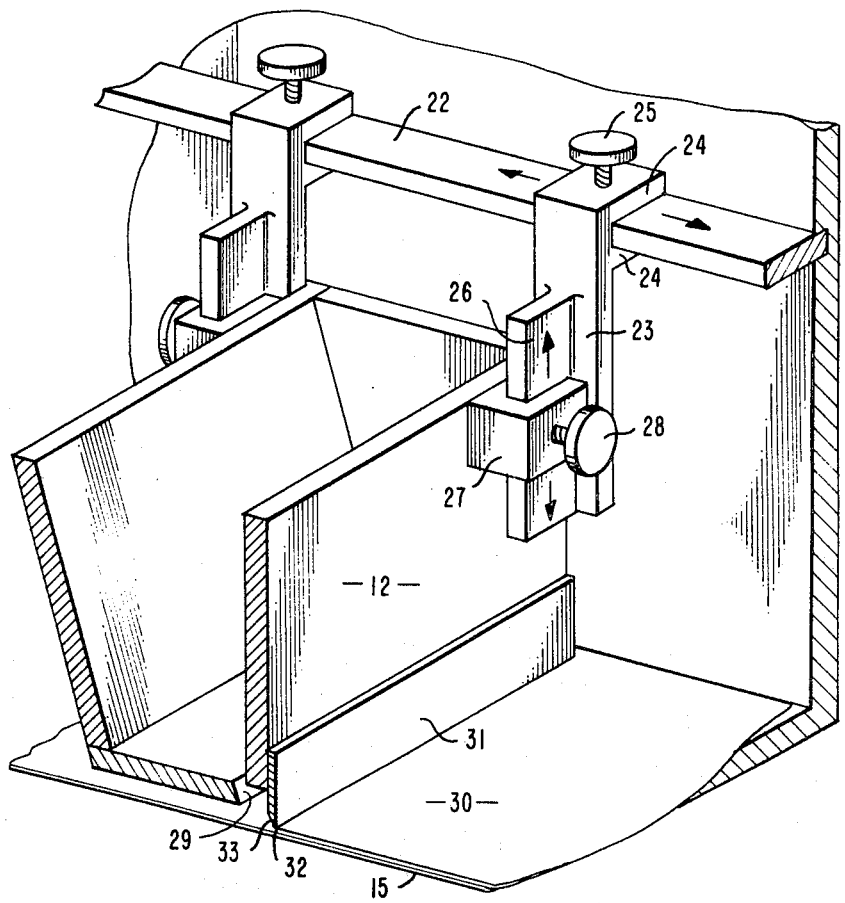

FIGURE 3 is an enlarged fragmentary longitudinal cross-sectional view showing an intermediate stage of the method as illustrated in FIGURE 1, wherein the membrane is being subjected to a refrigerated water bath treatment and showing the membrane being stripped from the belt on which it was originally cast; and FIGURE 4 is an enlarged fragmentary perspective view, partially broken away, of the casting box and the mounting assembly therefor for depositing the film-forming solution onto the surface of the moving elongated belt, as shown in FIGURE 2.

Referring more specifically to the drawings, FIGURE 1 diagrammatically illustrates the method and apparatus for continuously fabricating a desalination membrane in accordance with the present invention. Reference numeral 10 broadly designates a casting box assembly which comprises a housing 11 having a hopper or receptacle 12 serving as a casting box adjustably mounted therein and a table 13 supported on the floor of the housing 11. The forward end of the table 13 is equipped with a delivery roll 14 on which an elongated belt 15 is wound, the belt 15 being guided longitudinally across a platform defined by the top of the table 13 within the housing 11 by suitable guide means, such as a guide roll 16 and out through a slot 17 provided in the rear wall of the housing 11 to a take-up roll to be subsequently described. A refrigeration unit 20 is associated with the housing 11 so that the interior of the housing 11 may be maintained at a predetermined temperature, preferably below ambient temperature.

As seen more clearly in FIGURE 2, the housing 11 further contains a series of vapor baffles 21, two such vapor baffles 21 being illustrated. The vapor baffles 21 comprise a plurality of plates which are arranged in longitudinal alignment so as to be disposed in spaced, superimposed, parallel relationship to the platform defined by the top of the table 13 and the belt 15 extending thereacross. The vapor baffles 21 may be independently adjusted vertically so as to vary the space between the respective vapor baffles 21 and the belt 15 extending across the top of table 13, such vertical adjustment of the vapor baffles 21 being accomplished by suitable means.

The hopper or receptacle serving as the casting box 12 is mounted for longitudinal and vertical adjustment within the housing 11 so as to be disposed above the table 13 at the forward end thereof. Referring to FIGURE 4, it will be observed that the opposite side walls of the housing 11 are respectively provided with an internal elongated track 22 running the length of the housing 11, only one such track 22 being illustrated in FIGURE 4. The tracks 22 are disposed adjacent the top of the housing 11 such that the casting box 12 can be dependingly supported therefrom above the top of table 13. Means are provided to mount the casting box 12 in depending relation from the tracks 22 so as to permit both longitudinal and vertical adjustments of the casting box 12 with respect to the top of table 13. The mounting means comprises four mounting assemblies of identical construction disposed respectively at the four corners of the casting box 12. Each of the mounting assemblies includes a bracket member 23. The bracket member 23 is provided with a pair of spaced parallel legs 24 extending transversely outwardly from the upper end thereof and defining a track-receiving channel therebetween. The legs 24, 24 serve as runners which are respectively disposed for slidable engagement with the upper and lower surfaces of the track 22 corresponding thereto, the track 22 being received in the channel defined by the space between the legs 24, 24. A thumb-screw 25 is mounted in a suitably threaded bore provided in the upper leg 24 and is adapted to extend therethrough into engagement with the upper surface of the track 22 so as to fix the bracket member 23 at a selected location along the track 22 when the thumb-screw 25 is tightened. The bracket member 23 further includes a vertical flange 26 which extends transversely inwardly from the inner surface thereof, the vertical flange 26 acting as a bracket track along which the casting box 12 may be slidably adjusted vertically with respect to the top of the table 13. To this end, each of the mounting assemblies further includes a channel-shaped guide member 27 which is affixed to the casting box 12 at a respective corner thereof for slidably receiving the bracket track 26 of the bracket member 23 corresponding thereto to permit vertical adjustment of the casting box 12. Each channel-shaped guide member 27 is provided with a thumb-screw 28 which is received in a suitably threaded bore formed in the outermost leg of the channel-shaped guide member 27 and is adapted to extend therethrough into engagement with the opposed surface of the bracket track 26. The thumb-screw 28 when tightened fixes the channel-shaped guide member 27 in a selected vertical position on the bracket track 26.

The casting box 12 is of the gravity-flow type in that the film-forming solution to be contained therein is dispensed by gravity through a transverse slot 29 provided in the bottom of the casting box 12. As shown, this transverse dispensing slot 29 is defined in the casting box 12 by spacing the bottom wall thereof from the rear wall, wherein the space between the bottom and rear walls of the casting box 12 has a transverse extent equal to the internal transverse width of the casting box 12 as measured between the internal surfaces of its side walls. A transversely extending doctor blade 31 is fixedly mounted across the outer surface of the rear wall of the casting box 12 so as to depend therefrom partially below the bottom wall of the casting box 12. The lower leveling end of the doctor blade 31 comprises a flat lower edge surface 32 and a beveled surface 33 leading thereinto, rather than a knife edge.

The casting box 12 is adapted to contain a film-forming casting solution which is gellable to form a desalination membrane 30 suitable for use in desalination processes involving the reverse osmosis technique. The film-forming casting solution is dispensed by gravity flow through the transverse slot 29 defined in the bottom of the casting box 12 and onto the belt 15 which extends across the top of the table 13 such that belt 15 forms a substrate for the film-forming casting solution which is applied thereto as a uniform coating along the length of the belt 15. In this respect, as will become more apparent hereinafter, the belt 15 is caused to undergo continuous movement across the top of the table 13 as the film-forming casting solution is applied thereto from the casting box 12. The doctor blade 31 performs a leveling function on the gellable casting solution as it is dispensed from the casting box 12 onto the belt 15 wherein the flat lower edge surface 32 of the doctor blade 31 conditions the casting solution so that the coating thereof applied to the belt 15 is of substantial uniformity along the length of the belt 15.

The film-forming casting solution may comprise any suitable solution which is gellable to form a desalination membrane for use in processes involving the principle of reverse osmosis to desalinate water. Typical casting solutions of this type are described in copending U.S. patent application of William M. King and Paul A. Contor, Serial No. 521,034, filed January 17, 1966 and assigned to the assignee of the present application.

Following application of the film-forming casting solution to the moving belt 15, the moving belt 15 with its membrane coating 30 travels through the slot 17 provided in the rear wall of the housing 11 and into a cold water bath to be hereinafter described. In the latter connection, a large vat or tank 34 is located adjacent the housing 11 and downstream thereof so as to be in longitudinal alignment with the slot 17. The tank 34 is adapted to be filled with water which is maintained at a temperature lower than ambient so as to provide a cold water bath treatment for the membrane coating 30 on the moving belt 15 which is adapted to be immersed therein. To this end, it will be observed that a belt take-up roll 35 is mounted on the bottom wall of the tank 34 at the end thereof remote from the housing 11. The take-up roll 35 is positively driven and receives an end of the belt 15 thereon so as to wind the belt 15 wherein while rotating, thereby imparting longitudinal movement to the belt 15 between the delivery roll 14 and the take-up roll 35. Between the take-up roll 35 and the casting box assembly 10, guiding means are provided to direct the belt 15 with the membrane coating 30 thereon into the tank 34 and below the surface of the cold water contained therein for subjecting the membrane coating 30 to a cold water bath treatment. As shown, such guiding means may take the form of a first or upper idler roll 36 located in the upper portion of the tank 34 at the end thereof adjacent the slot 17 formed in the housing 11 of the casting box assembly 10. A second or lower idler roll 37 is located between the upper guide roll 36 and the take-up roll 35 at the bottom of the tank 34. Thus, the belt 15 with its membrane coating 30 emerges from the housing 11 through the slot 17 at the rear of the housing 11 and is directed downwardly by the upper guide roll 36 to the lower intermediate guide roll 37 for immersing the membrane coating 30 on the belt 15 in the cold water contained in the tank 34. The cold water treatment sets the membrane 30 and washes out or leaches out excess solvent material or salts from the membrane 30.

As the membrane-coated belt 15 passes by the lower intermediate guide roll 37, means are provided for stripping the membrane coating 30 therefrom which has now been gelled and set as a solidified sheet. To this end, a wedge-shaped stripping blade 40 is mounted just to the rear of the guide roll 37 so as to extend transversely across the tank 34, as best shown in FIGURE 3. While the coating 30 on the belt 15 has now coagulated into a continuous membrane and will readily strip from the belt substrate, the stripping blade or wedge 40 facilitates such stripping action. Following stripping of the membrane 30 from the substrate belt 15, the belt 15 continues on in its path of movement to the take-up roll 35 on which it is wound, while the film or membrane 30 is thereafter directed upwardly onto a guide roll 41 located at the top of the tank 34 adjacent the rear end wall thereof. A suitable refrigeration unit 42 is associated with the tank 34 for maintaining the water to be contained therein at a predetermined temperature below ambient.

From the tank 34 containing the refrigerated water for subjecting the membrane 30 to a cold water bath treatment, the membrane 30 is thereafter directed to a second tank or vat 43 which is adapted to be filled with water maintained at a temperature higher than ambient. The membrane 30 is entrained about a series of guide rolls 44 disposed at upper and lower levels within the tank 43 so as to immerse the membrane 30 within the heated water contained in the tank 43. The water within the tank 43 is maintained at a temperature higher than ambient by suitable heating means, not shown. The length of time during which the membrane 30 is immersed in the heated water within the tank 43 is governed by the speed of the moving membrane 30 and the arrangement and number of the guide rolls 44 located within the tank 43. The heat-treatment bath anneals the membrane 30 causing contraction of its cellulose acetate structure to give the membrane 30 its ability to pass water therethrough while restraining the passage of salt.

A series of spray nozzles 45 are located rearwardly of the heat-treatment bath provided by the tank 43 and the heated water therein, the spray nozzles 45 being adapted to direct water sprays onto the membrane 30 as it emerges from its heat-treatment bath for cooling purposes. Additionally, the water from the spray nozzles 45 moistens the membrane 30 to prevent the membrane from drying out, wrinkling, or becoming heat-set, thereby guarding against an irreversible loss of water content in the membrane 30.

After cooling by the water sprays released from the spray nozzles 45, the membrane 30 is directed onto a possitively driven membrane take-up roll 46 located downstream of the spray nozzles 45. The speed at which the take-up roll 46 is driven may be varied, as desired, by a variable speed drive 47 which rotates the take-up roll 46. The variable speed drive 47 is synchronized with a similar variable speed drive (not shown) for the belt take-up roll 35. In this way, the necessary parameters as to length of treatment of the membrane 30 during various stages of the method may be observed. A membrane take-up roll 46 upon receiving the desired number of windings of the membrane 30 entrained thereabout is then placed in a storage tank (not shown), where the elongated membrane 30 wound thereon is immersed in water at all times during storage to prevent loss of water content which is irreversible and adversely affects the performance of the membrane in desalinating water.

In practicing the invention, a film-forming casting solution is prepared which may comprise, for example, 1200 grams of acetone (C.P. grade), 500 grams of Eastman E 398–3 cellulose acetate available from the Eastman Chemical Company of Rochester, N.Y., 250 grams of water and 125 grams of tartaric acid (N.F. powder grade).

In the example given the water and acetone were thoroughly mixed, and the solids, cellulose acetate and tartaric acid, were added to the water-acetone solvent solution. The resulting mixture was thoroughly stirred for 20–30 minutes to dissolve the cellulose acetate, thereby forming a viscous casting solution which may be placed in the casting box 12 so as to be subsequently deposited upon the moving belt 15.

A portion of the belt 15 is unwound from the delivery roll 14 and threaded onto the belt take-up roll 35 so as to extend across the platform defined by the top of table 13. The belt 15 may be made of any suitable material which will not be chemically affected by the application of the casting solution thereto or by immersion in the cold water bath. Stainless steel or polyethylene terephthalate film, known as "Mylar," a trademark of E. I. Dupont De Nemours & Co., of Wilmington, Del., are examples of suitable belt material. The belt take-up roll 35 is then driven to wind the belt 15 thereabout, which moves the belt 15 across the top of the table 13. The belt speed was adjusted to 2 feet/minute. The casting box 12 was adjusted above the moving belt 15 so as to set the lower flat edge 32 of the doctor blade 31 at a distance 0.012 inch above the belt 15. The film-forming solution is then continuously cast onto the moving belt 15 which passes out of the housing 11 for the casting box assembly 10 through the slot 17. During the time that the casting of the film-forming solution onto the belt 15 was being carried out, the temperature within the housing 11 was maintained at −11° C. by the refrigeration unit 20. The membrane coating 30 on the belt 15 was within the housing 11 of the casting box assembly over a 3 minute period. The vapor baffles 21 are instrumental in maintaining a saturated atmosphere of acetone above the membrane-coated belt 15 and in preventing convective currents from passing across the membrane-coated belt 15. This further aids in preventing air drying of the membrane coating 30 during the casting procedure.

The membrane-coated belt 15 is then directed into the tank 34 where the membrane coating 30 thereon is immersed in the cold water which is maintained at 1.5° C. by the refrigeration unit 42. The membrane 30 required 2.25 minutes to traverse the cold water bath treatment. It will be understood that initially the membrane 30 is manually stripped from the belt 15 and processed through the heated water bath treatment and past the spray nozzles 45 so that the membrane 30 can be threaded onto the membrane take-up roll 46. Thereafter, the membrane take-up roll 46 is positively driven by the variable speed drive 47 to wind the membrane 30 thereabout and thereby impart movement to the membrane 30 independent of the movement of the belt 15, but in synchronization therewith. The membrane 30 is then automatically stripped from the belt 15 while undergoing the cold water bath treatment, such stripping being facilitated by the action of the wedge 40. The membrane 30 is then directed into the tank 43 containing the heated water which is maintained at a temperature of 85° C. An appropriate thermostatic means, not shown, is preferably associated with the heating unit for heating the water contained in the tank 43 so as to maintain a constant temperature of such water while the membrane 30 is traveling therethrough, which in the given example was 85° C. The speed of the membrane 30 through the heated water bath was adjusted such that the membrane 30 was immersed in the heated water bath for a period of 3 minutes. Emerging from the heated water bath, the hot membrane 30 was cooled and moistened by water from the spray nozzles 45 to prevent drying out, wrinkling, and heat-setting thereof which might otherwise occur. A cellulose acetate desalination membrane prepared in accordance with the present invention and as related in the foregoing example was found to have a flux of 12 gallons/square foot/day and a salt permeation of 1.4% against 35,000 p.p.m. sodium chloride feed water at 1500 p.s.i.

It will therefore be apreciated that we have disclosed a method and apparatus for continuously fabricating a desalination membrane which does not require solvent evaporation from the membrane as a separate step following the casting of the membrane from a film-forming solution. The membrane is therefore exposed to air for a minimum time only following the casting thereof before it is immersed in a cold water bath treatment. This prevents loss of water content from the membrane which is an irreversible process and which adversely affects the proper performance of the membrane, while also permitting flexibility in the speed at which the membrane may be cast. Desalination membranes offering superior performance have been found to have a water content ranging between 54–60%, and the present method and apparatus consistently produce continuous desalination membranes whose water content lies within this preferred range of percentages. Our method and apparatus provide for effective control over the various parameters necessary to produce a satisfactory desalination membrane so as to yield a continuous membrane exhibiting a high degree of homogeneity.

While casting solutions differing from the specific casting solution described herein may be suitably used in practicing the method according to the present invention, it has been found that a desalination membrane made from a casting solution containing tartaric acid as a swelling agent releases easily from a substrate belt 15 of "Mylar." A desalination membrane made from a casting solution containing tartaric acid as a swelling agent exhibits greater resistance to tearing and is generally tougher than other membranes of comparable performance.

We claim:
1. A continuous process for producing a film suitable for use as a desalination membrane of the reverse osmosis type, which comprises
    (a) continuously applying a casting solution which includes a gellable substance capable of serving as a desalination membrane when in film form to the surface of a moving elongated belt so as to provide a substantially uniform coating of the casting solution along the length of the belt,
    (b) directing the moving belt coated with the casting solution through a refrigerated water bath to immerse the film formed by the casting solution in cold water,
    (c) stripping the film formed by the casting solution from the belt, and
    (d) directing the film through a heated water bath.
2. A continuous process as set forth in claim 1, further including the step of
    (a) maintaining a substantially solvent-saturated atmosphere about the moving belt following its coating with the casting solution as the coated belt moves away from the point at which the casting solution is applied thereto during the period prior to the immersion of the coated belt in the refrigerated water bath.
3. A continuous process as set forth in claim 1, wherein
    (a) the casting solution is comprised of cellulose acetate dissolved in a solvent mixture including acetone and water.
4. A continuous process as set forth in claim 1, wherein
    (a) stripping of the film from the belt occurs while the coated belt is immersed in the refrigerated water bath.
5. A continuous process as set forth in claim 1, further including the step of
    (a) spraying water onto the film as it emerges from the heated water bath to cool the film and help in preserving its moisture content.
6. A continuous process as set forth in claim 1, further including
    (a) winding the film on a driven take-up roll following its emergence from the heated water bath, and
    (b) storing the take-up roll with the film wound thereon under water.
7. A continuous process for producing a film suitable for use as a desalination membrane of the reverse osmosis type, which comprises

(a) continuously applying a casting solution comprising cellulose acetate dissolved in a solvent mixture including acetone and water to the surface of a moving elongated belt so as to provide a substantially uniform coating of the casting solution along the length of the belt, (b) maintaining a substantially acetone-saturated atmosphere about the moving belt following the application of the casting solution thereto, (c) directing the moving belt coated with the casting solution through a refrigerated water bath to immerse the film formed by the casting solution in cold water, (d) stripping the film formed by the casting solution from the belt while the film and the belt are immersed in the refrigerated water bath, (e) winding the belt onto a take-up roll following the stripping of the film therefrom, (f) directing the film through a heated water bath, (g) spraying water onto the film as it emerges from the heated water bath to cool the film and help in preserving its moisture content, and (h) winding the film on a take-up roll in timed relation to the winding of the belt onto its take-up roll following emergence of the film from the heated water bath.

8. Apparatus for continuously fabricating a desalination membrane of the reverse osmosis type comprising (a) an elongated belt continuously movable in a predetermined path of travel, (b) means to dispense a film-forming solution onto a surface of said belt and disposed at a particular position with respect to said belt so as to deposit a substantially uniform coating of the film-forming solution along the length of said belt as said belt is moving, (c) cold water treatment means lying within the path of travel of said belt for receiving said belt following deposit of the coating of film-forming solution thereon so as to immerse the coating of film-forming solution on said belt in water maintained at a temperature lower than ambient, said coating of film-forming solution being separable from said belt as an elongated film defining a membrane, and (d) hot water treatment means for receiving said membrane following its separation from said belt so as to immerse said membrane in water maintained at a temperature higher than ambient.

9. Apparatus as set forth in claim 8, further including (a) vapor baffle means disposed downstream from said film-forming solution dispensing means in spaced superimposed relation to said moving belt so as to define a confined space between said vapor baffle means and said belt.

10. Apparatus as set forth in claim 8, further including (a) a plurality of spray nozzles disposed downstream of said hot water treatment means and directed toward the path of travel of the membrane so as to spray water thereonto.

11. Apparatus as set forth in claim 8, further including (a) means for storing said membrane following its subjection to said hot water treatment means.

12. Apparatus for continuously fabricating a desalination membrane of the reverse osmosis type comprising (a) a hopper adapted to contain a film-forming casting solution, (b) a delivery roll containing a supply of an elongated belt wound thereabout, (c) a first container adapted to be filled with water maintained at a temperature lower than ambient, (d) a first driven take-up roll disposed in said first container for receiving the belt from said delivery roll, (e) said belt being movable in a path extending between said delivery roll and said first take-up roll so as to pass said hopper, (f) said hopper being provided with means to dispense the film-forming casting solution therefrom as a coating onto the surface of the moving belt as the belt travels from the delivery roll to the first take-up roll, (g) means to guide the belt having the coating of casting solution thereon into the cold water in said first container, (h) means within said first container to strip the coating of casting solution from the belt prior to the reception of said belt by said first take-up roll, (i) a second container adapted to be filled with water maintained at a temperature higher than ambient, (j) means to direct the stripped coating of casting solution into the heated water in said second container, (k) a second driven take-up roll disposed downstream from said second container for receiving the membrane formed by the stripped coating of casting solution as it emerges from the heated water of said second container, and (l) said second take-up roll being driven in timed relation to said first take-up roll so as to synchronize the stripping of the coating from said belt with the winding of said membrane about said second take-up roll.

13. Apparatus as set forth in claim 12, further including (a) a housing in which said hopper is disposed, (b) a platform in said housing extending below said hopper and supporting the portion of said movable belt extending between said delivery roll and said means for guiding said belt into the cold water in said first container, and (c) a plurality of longitudinally aligned plate baffles mounted in said housing in spaced parallel relation to said platform to overlie the portion of said movable belt supported on said platform.

References Cited

UNITED STATES PATENTS 3,133,132  5/1964  Loeb et al. _____ 264—49
3,283,042  11/1966  Loeb et al. _____ 264—49

FOREIGN PATENTS 765,477  6/1934  France.

OTHER REFERENCES

U.S. Office of Saline Water, "Design and Construction of a Desalination Pilot Plant," Research and Development Progress Report No. 86, by Aerojet-General, January 1964, pp. 5–7.

PHILIP E. ANDERSON, *Primary Examiner.*

U.S. Cl. X.R.

18—15; 210—500; 264—212, 216